United States Patent
Wang et al.

(10) Patent No.: US 7,436,151 B2
(45) Date of Patent: Oct. 14, 2008

(54) SYSTEMS AND METHODS FOR DETECTING CHARGE SWITCHING ELEMENT FAILURE IN A BATTERY SYSTEM

(75) Inventors: Ligong Wang, Round Rock, TX (US); Bruce A. Miller, Plano, TX (US); Stephen D. Sterz, Hutto, TX (US)

(73) Assignee: Dell Products L.P., Round Rock, TX (US)

( * ) Notice: Subject to any disclaimer, the term of this patent is extended or adjusted under 35 U.S.C. 154(b) by 280 days.

(21) Appl. No.: 11/021,926

(22) Filed: Dec. 23, 2004

(65) Prior Publication Data

US 2006/0139006 A1 Jun. 29, 2006

(51) Int. Cl.
*H02J 7/00* (2006.01)

(52) U.S. Cl. ........................ 320/134; 320/136

(58) Field of Classification Search ............... 320/132, 320/134, 136, DIG. 12
See application file for complete search history.

(56) References Cited

U.S. PATENT DOCUMENTS

| | | | |
|---|---|---|---|
| 5,007,027 A | | 4/1991 | Shimoi |
| 5,144,218 A | * | 9/1992 | Bosscha ................ 320/139 |
| 5,155,428 A | | 10/1992 | Kang |
| 5,530,336 A | | 6/1996 | Eguchi et al. |
| 5,581,170 A | * | 12/1996 | Mammano et al. ........ 320/116 |
| 5,652,501 A | | 7/1997 | McClure et al. |
| 5,703,463 A | | 12/1997 | Smith |
| 5,898,234 A | | 4/1999 | Kitagawa |
| 5,986,865 A | | 11/1999 | Umeki et al. |
| 6,031,302 A | | 2/2000 | Levesque |
| 6,046,575 A | | 4/2000 | Demuro |
| 6,051,955 A | | 4/2000 | Saeki et al. |
| 6,060,864 A | * | 5/2000 | Ito et al. ................ 320/136 |
| 6,097,175 A | | 8/2000 | Yoon |
| 6,124,700 A | * | 9/2000 | Nagai et al. ............. 320/132 |
| 6,157,171 A | | 12/2000 | Smith |
| 6,172,485 B1 | | 1/2001 | Fujita et al. |
| 6,174,617 B1 | * | 1/2001 | Hiratsuka et al. .......... 429/90 |
| 6,204,633 B1 | * | 3/2001 | Kitagawa ................. 320/128 |

(Continued)

FOREIGN PATENT DOCUMENTS

EP 0607041 A2 7/1994

(Continued)

OTHER PUBLICATIONS

Co-pending Application Entitled "Method For Verifying Smart Battery Failures By Measuring Input Charging Voltage And Associated Systems", U.S. Appl. No. 11/021,377, filed Dec. 23, 2004, 16 pgs.

(Continued)

*Primary Examiner*—Adolf Berhane
*Assistant Examiner*—M'Baye Diao
(74) *Attorney, Agent, or Firm*—O'Keefe, Egan, Peterman & Enders

(57) ABSTRACT

Systems and methods for detection of charge switching element failure (e.g., charge FET switching element) in a battery system, such as a battery system of an information handling system (e.g. notebook computer), in which an increase in cell voltage is employed as a criteria for detecting charge switching element failure.

23 Claims, 5 Drawing Sheets

U.S. PATENT DOCUMENTS

| | | |
|---|---|---|
| 6,222,346 B1 | 4/2001 | Mori |
| 6,268,713 B1 | 7/2001 | Thandiwe |
| 6,388,426 B1 | 5/2002 | Yokoo et al. |
| 6,445,164 B2 * | 9/2002 | Kitagawa .................... 320/134 |
| 6,492,791 B1 | 12/2002 | Saeki et al. |
| 6,495,989 B1 * | 12/2002 | Eguchi ....................... 320/132 |
| 6,531,846 B1 | 3/2003 | Smith |
| 6,571,091 B1 | 5/2003 | Janssen et al. |
| 6,636,020 B1 | 10/2003 | Ronald |
| 6,646,422 B2 * | 11/2003 | Hogari et al. ............... 320/134 |
| 6,683,449 B1 * | 1/2004 | Bell et al. ................. 324/158.1 |
| 6,710,992 B2 | 3/2004 | Pannwitz et al. |
| 6,777,915 B2 | 8/2004 | Yoshizawa et al. |
| 6,804,098 B2 | 10/2004 | Pannwitz |
| 6,996,734 B2 * | 2/2006 | Fiebrich et al. ............. 713/340 |
| 2001/0021092 A1 | 9/2001 | Astala |
| 2002/0195996 A1 * | 12/2002 | Nakatsuji .................... 320/127 |
| 2003/0107347 A1 | 6/2003 | Yoshizawa et al. |
| 2003/0193318 A1 * | 10/2003 | Ozawa et al. ............... 320/132 |
| 2004/0227490 A1 * | 11/2004 | MacNair et al. ............. 320/132 |

FOREIGN PATENT DOCUMENTS

| | | |
|---|---|---|
| EP | 0607041 A3 | 7/1994 |
| EP | 1533881 A2 | 5/2005 |
| EP | 1594209 A1 | 11/2005 |
| JP | 2000078760 A | 3/2000 |
| KR | 100222428 B1 | 7/1999 |
| KR | 100254776 B1 | 2/2000 |
| WO | WO00/51219 | 8/2000 |

OTHER PUBLICATIONS

Maxim, "High-Precision Li+ Battery Monitor With Alerts", Dallas Semiconductor, Rev. Nov. 17, 2003, DS2762, 26 pgs.

* cited by examiner

SYSTEMS AND METHODS FOR DETECTING CHARGE SWITCHING ELEMENT FAILURE IN A BATTERY SYSTEM

BACKGROUND OF THE INVENTION

1. Field of the Invention

This invention relates generally to battery systems, and more particularly to detection of charge switching element failure in a battery system.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Examples of portable information handling systems include notebook computers. These portable electronic devices are typically powered by battery systems such as lithium ion ("Li-ion") or nickel metal hydride ("NiMH") battery packs including one or more rechargeable batteries. FIG. 1 shows a battery system 120 of a portable information handling system 100 having battery charge terminals 122, 124 that are temporarily coupled to corresponding charge output terminals 115, 116 of a battery charging apparatus 110. As so configured, battery charging apparatus 110 is coupled to receive current from current supply terminals 112, 114 (e.g., alternating current, or direct current from an AC adapter) and to provide DC charging current to battery charge terminals 122, 124 of battery system 120 via charge output terminals 115, 116. As shown, battery system 120 also includes battery system data bus (SMBus) terminals 126, 128 for providing battery state information, such as battery voltage, to corresponding battery charging apparatus data bus terminals 117, 118.

FIG. 2 shows a conventional lithium ion battery system 120 having a battery management unit ("BMU") 202 responsible for monitoring battery system operation and for controlling battery system charge and discharge circuitry 270 that is present to charge and discharge one or more battery cells of the battery system. As shown, BMU 202 includes analog front end ("AFE") 206 and microcontroller 204. Charge and discharge circuitry 270 of battery system 120 includes two field effect transistors ("FETs") 214 and 216 coupled in series between battery charge terminal 122 and battery cell/s 224. FET 214 is a charge FET switching element that forms a part of charge circuit 260 that is controlled by microcontroller 204 and/or AFE 206 of BMU 202 using switch 218 to allow or disallow charging current to the lithium ion battery cell/s 224, and FET 216 is a discharge FET switching element that forms a part of discharge circuit 262 that is controlled by microcontroller 204 and/or AFE 206 of BMU 202 using switch 220 to allow or disallow discharge current from the battery cell/s 224. As shown, parasitic diodes are present across the source and drain of each FET switching element, i.e., to conduct charging current to the battery cell/s when the discharge FET switching element 216 is open, and to conduct discharging current from the battery cell/s when the charge FET switching element 214 is open.

During normal battery pack operations both charge and discharge FET switching elements 214 and 216 are placed in the closed state by respective switches 218 and 220, and cell voltage detect circuitry 210 of AFE 206 monitors voltage of battery cell/s 224. If cell voltage detect circuitry 210 of AFE 206 detects a battery over-voltage condition, BMU 202 opens the charge FET switching element 214 to prevent further charging of the battery cell/s until the over-voltage condition is no longer present. Similarly, if the cell voltage detect circuitry 210 of AFE 206 detects a battery under-voltage (or over-discharge) condition, BMU 202 opens the discharge FET switching element 216 to prevent further discharging of the battery cell/s until the under-voltage condition is no longer present. BMU 202 may also open the charge FET switching element 214 when the battery pack is in sleep mode.

A current sense resistor element 212 is present in the battery pack circuitry to allow current sensor 208 of AFE 206 to monitor charging current to the battery cell/s. If the charge FET switching element 214 is supposed to be open (e.g., during sleep mode or battery over-voltage condition) but charging current is detected, BMU 202 permanently disables the battery pack by blowing an inline fuse 222 present in the battery circuitry to open the battery pack circuitry and prevent further over-charging. In one conventional implementation, if charge FET switching element 214 is supposed to be open but current sensor 208 of AFE 206 detects a charging current of greater than 128 milliamperes for a time period of 4 seconds, then BMU 202 permanently disables the battery pack by blowing an inline fuse 222.

When a conventional battery pack is in sleep mode or over-voltage condition (with open charge FET), a false charging current may nonetheless be detected by the BMU. Such a false charging current may result from noise and/or radio frequency interference, e.g., electromagnetic field (EMF), radio frequency (RF) interference. A false charging current may also result from a floating pin on AFE 206 without offset compensation. If the false charging current is of sufficient magnitude and duration when the charge FET is supposed to be open, the BMU assumes that the charge FET has failed and blows the fuse in error, permanently disabling a properly functioning battery pack. This results in high battery pack failure incidents, increasing costs for both manufacturer and consumer.

Past attempts to address improper charge FET failure detection have included increasing the minimum detected charging current (from 125 mA to 500 mA) required prior to blowing the battery circuitry fuse, setting a minimum detected maximum cell voltage (4.25V) that is required to blow the fuse, and requiring that these minimum detected charging current and minimum detected maximum cell voltage conditions to be present for a number of consecutive samples (e.g., 32 consecutive samples). However, all of these attempted solutions make the BMU less likely to detect an actual charge FET failure.

SUMMARY OF THE INVENTION

Disclosed herein are systems and methods for detection of charge switching element failure (e.g., charge FET switching element) in a battery system, such as a battery system of an information handling system (e.g. notebook computer). The disclosed systems and methods may be advantageously configured to use an increase in cell voltage as a criteria for detecting charge switching element failure. This is in contrast to conventional battery packs that rely on current measurement as the primary indicator for charge FET failure, and which are therefore susceptible to false charging current indications. In one embodiment, the disclosed systems and methods may be configured to use an increase in cell voltage as a criteria for detecting charge switching element failure at any charge level of the battery cells (e.g., fully charged or deeply discharged).

In one embodiment, the microcontroller of a battery system may be advantageously configured to combine measured battery circuit current with measured battery cell voltage information to detect charge switching element failure in a way that substantially eliminates the potential for disabling the battery system due to a false charging current indication, and without making it more difficult to detect an actual charge switching element failure. For example, the disclosed systems and methods may be implemented in one exemplary embodiment using the cell voltage analog to digital ("A/D") port of an AFE that operates at a voltage level of about 2 to 3 volts and that is relatively immune to noise. This is in comparison to the much lower operating voltage level (1 millivolts) of the current sense resistor A/D port of a conventional AFE that is easily influenced by external noise. Thus, the disclosed systems and methods may be implemented to detect charge switching element failure using cell voltage measurements that are much more reliable than current sense resistor measurements that are conventionally employed alone.

In one respect, disclosed herein is a method of detecting charge switching element failure in a battery system, including: monitoring for the presence of a battery charging current flowing to one or more battery cells of the battery system; monitoring voltage of the one or more battery cells of the battery system; and taking one or more failure state actions if both of the following conditions are detected to exist when the charge switching element of the battery system is supposed to be in a state that prevents flow of battery charging current to the one or more battery cells of the battery system: (i) battery charging current is flowing to the one or more battery cells, and (ii) voltage of the one or more battery cells is detected to be increasing.

In another respect, disclosed herein is a battery system configured to be coupled to a battery charging apparatus, the battery system including: one or more battery cells; battery current control circuitry configured to be coupled between the battery charging apparatus and the one or more battery cells, the battery current control circuitry including at least one charge switching element configured to control flow of the charging current to the battery cells from the battery charging apparatus; a switching element failure detector configured to take one or more failure state actions if both of the following conditions are detected to exist when the charge switching element of the battery system is supposed to be in a state that prevents flow of battery charging current to the one or more battery cells of the battery system: (i) battery charging current is flowing to the one or more battery cells, and (ii) voltage of the one or more battery cells is detected to be increasing.

In another respect, disclosed herein is a battery system for a portable information handling system configured to be coupled to a battery charging apparatus, the battery system including: one or more battery cells; a charge circuit configured to be coupled between the battery charging apparatus and the one or more battery cells, the charge circuit including a charge FET switching element and being configured to receive a charging current from the battery charging apparatus; an inline fuse configured to be coupled between the battery charging apparatus and the one or more battery cells; and a battery management unit (BMU) coupled to the charge circuit, the BMU including a microcontroller. The BMU may be configured to control operation of the inline fuse so as to permanently disable the battery system if both of the following conditions are detected to exist when the charge FET switching element of the battery system is supposed to be in a state that prevents flow of battery charging current to the one or more battery cells of the battery system: (i) battery charging current is flowing to the one or more battery cells, and (ii) voltage of the one or more battery cells is detected to be increasing.

DESCRIPTION OF ILLUSTRATIVE EMBODIMENTS

Figure 3:
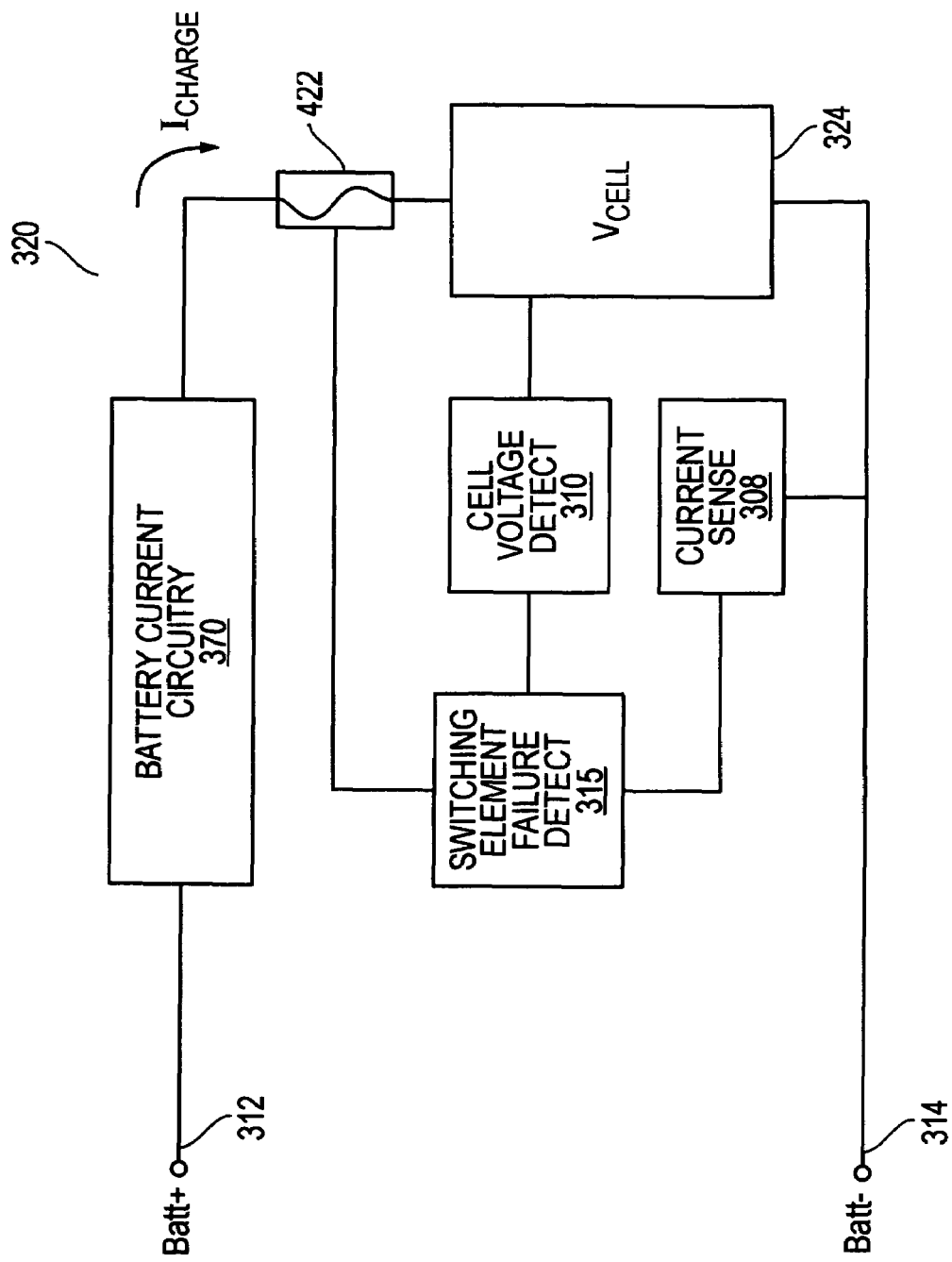
FIG. 3 is a block diagram of a battery system according to one embodiment of the disclosed systems and methods.

FIG. 3 shows a battery system 320 according to one embodiment of the disclosed systems and methods. Battery system 320 may be configured as a stand alone source of DC current, or may be provided as a permanent or replaceable component of a portable electronic device (e.g., battery pack of a portable information handling system such as a notebook computer). Besides notebook computers, other examples of such portable electronic devices include, but are not limited to, portable telephone devices (e.g., cellular phones, cordless phones, etc.), personal digital assistant ("PDA") devices, MP3 players, cameras, computer peripherals, etc. In addition to portable electronic devices, it will be understood that the disclosed systems and methods may be implemented to power any other type of electronic device that is at least partially battery powered and that has electronic circuitry that is coupled to receive current from a battery system. In this regard, the disclosed systems and methods may be advantageously implemented in applications where smart batteries are employed.

Figure 1:
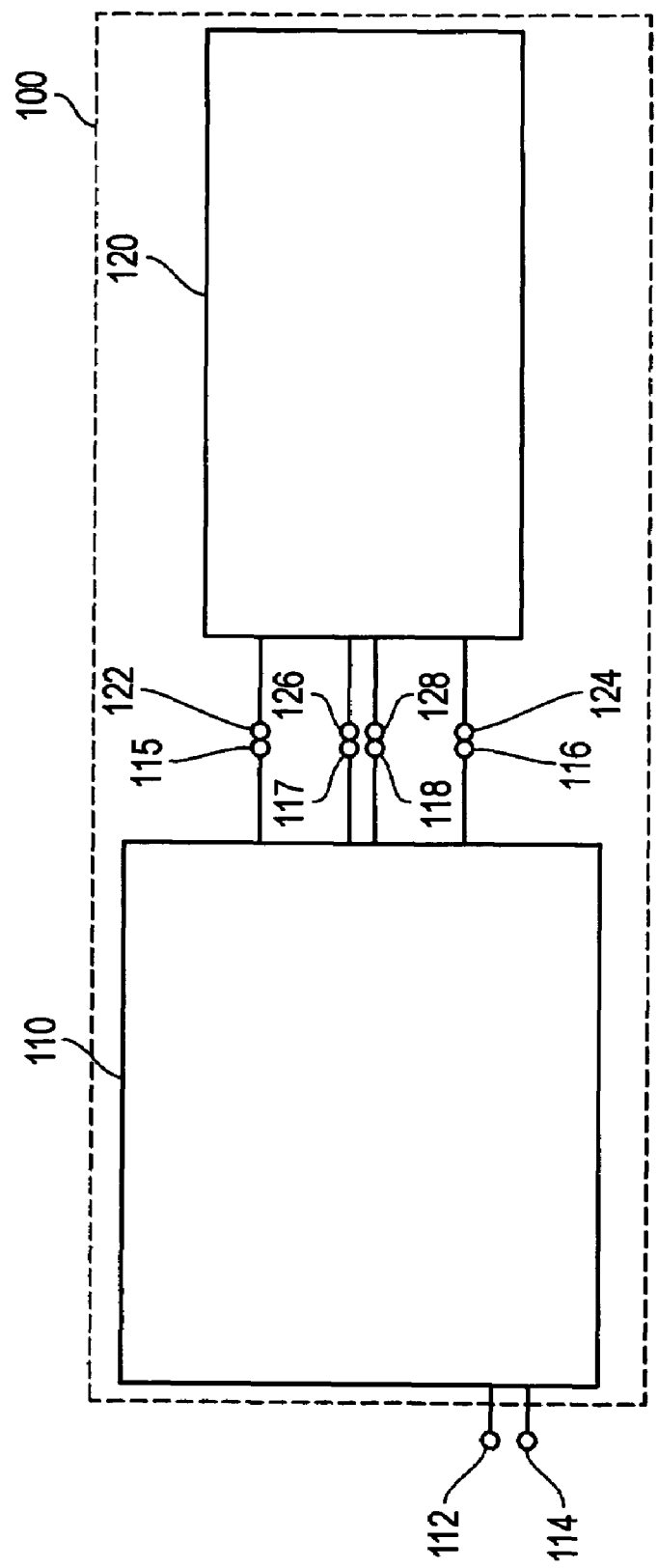
FIG. 1 is a block diagram of a conventional portable electronic device and battery charging apparatus.
Figure 2:
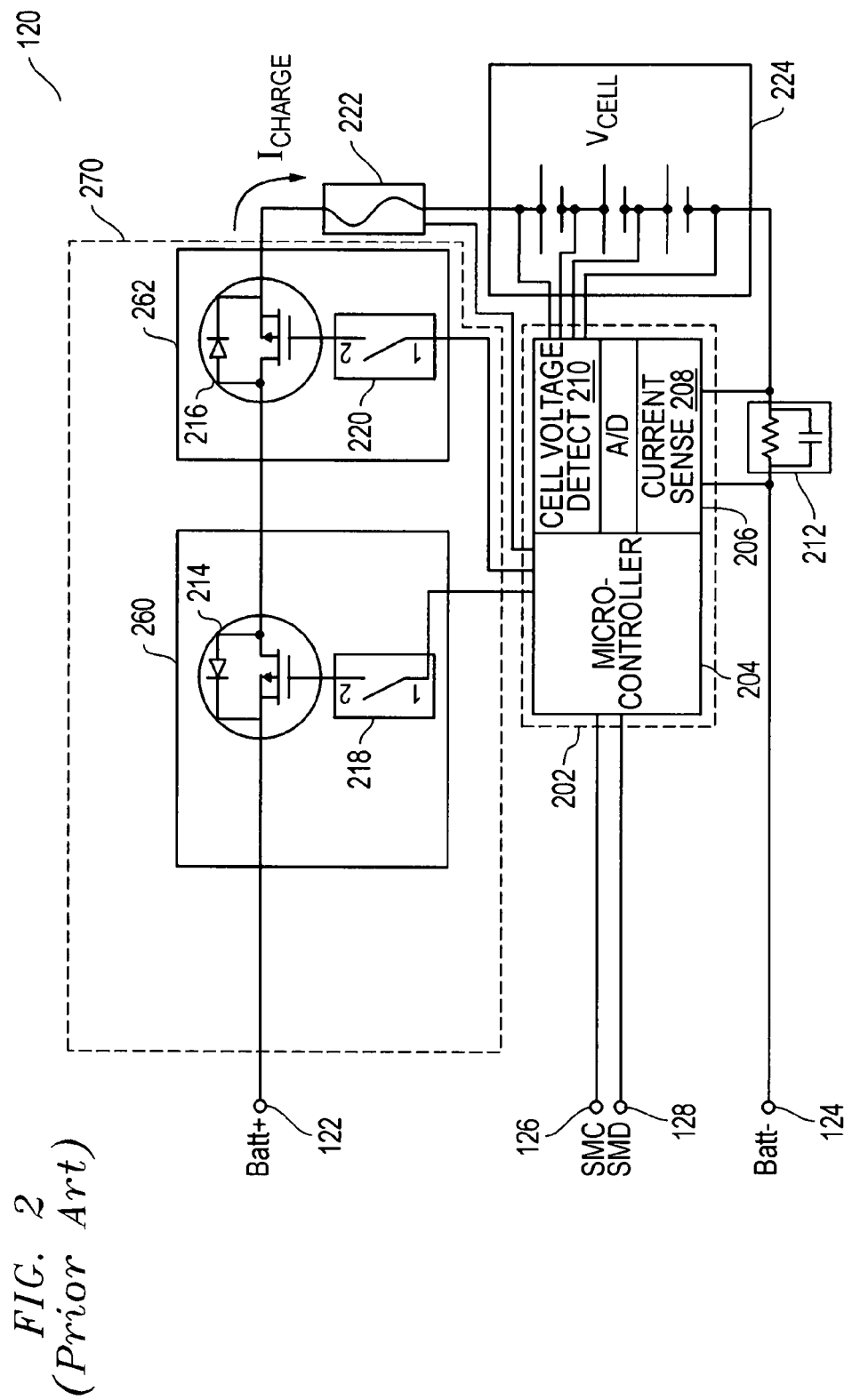
FIG. 2 is a block diagram of a conventional lithium ion battery system.

As shown in FIG. 3, battery system 320 includes one or more battery cell/s 324 coupled to battery terminals 312 and 314 that may be configured to be coupled to a battery charging apparatus (not shown), such as battery charging apparatus 110 of FIG. 1. It will be understood that when battery system 320 is provided as an integrated component of an electronic device, a corresponding battery charging apparatus may also be provided as an integrated part of the same electronic device, or may be provided as an external device to the electronic device. Battery cell/s 324 may be any type of rechargeable battery cell/s or combination thereof. Examples of such battery cells include, but are not limited to, Li-ion battery cells, NiMH battery cells, nickel cadmium (NiCd) battery cells, lithium-polymer (Li-polymer) battery cells, etc.

Battery system 320 is shown provided with battery current control circuitry 370 that is present to control flow of charging current to battery cell/s 324 of battery system 320 with one or more charge switching elements. Battery system 320 may be optionally configured to also control flow of discharge current from battery cell/s 324 of battery system 320, e.g., using one or more discharge switching elements. Also shown present is battery cell voltage detector 310 that is coupled to monitor voltage of battery cell/s 324 and to supply this information to switching element failure detector 315, and current sensor 308 that is present to monitor charging current to the battery cell/s 324 and to supply this information to switching element failure detector 315.

It will be understood that switching element failure detector 315, battery cell voltage detector 310, and current sensor 308 may each be implemented using any circuitry and/or control logic configuration suitable for performing the tasks thereof. For example, in one embodiment, one or more features of circuitry 315, 310 and 308 may be implemented using a controller (e.g., processor and associated firmware) that is integral to battery system 320 or using any other suitable configuration of microcontroller/microprocessor, firmware and/or software that interfaces with battery system circuitry/components. Furthermore, although illustrated as separate components, it will be understood that the tasks of switching element failure detector 315, battery cell voltage detector 310 and current sensor 308 may alternatively be performed by a single component, or may be performed by a combination of more than two separate components.

In operation of the system of FIG. 3, battery cell voltage detector 310 monitors voltage of battery cell/s 324 and supplies this information to switching element failure detector 315 (e.g., by control signal or other suitable method), and current sensor 308 monitors charging current to battery cell/s 324 and supplies this information to switching element failure detector 315 (e.g., by control signal or other suitable method). In turn, switching element failure detector 315 uses a combination of this monitored voltage and charging current information to sense failure of one or more charge switching elements in battery current control circuitry 370. In particular, switching element failure detector 315 may be configured to sense the presence of both charging current and increasing battery cell voltage at the same time charge switching element/s in battery current circuitry 370 are supposed to be open.

In one exemplary embodiment, switching element failure detector 315 may also be configured to permanently or temporarily disable battery system 320 upon detection of switching element failure. For example, switching element failure detector 315 may be coupled to blow inline fuse 422 of FIG. 3 (e.g., by control signal or other suitable method) to permanently disable battery pack 320 and prevent further overcharging by opening the battery charge circuit. Alternatively, switching element failure detector 315 may be coupled to permanently or temporarily disable battery pack 320 by any other suitable method including, but not limited to, by sending out proper SMBus commands to request extra protection from overcharge using circuitry outside of battery pack 320. Besides disabling battery pack 320 upon detection of switching element failure, switching element failure detector 315 may additionally or alternatively take other failure state actions, such as providing an indication of switching element failure (e.g., signal light and/or audible alarm), logging the failure into memory, shutting down battery pack circuitry, etc.

Figure 4:
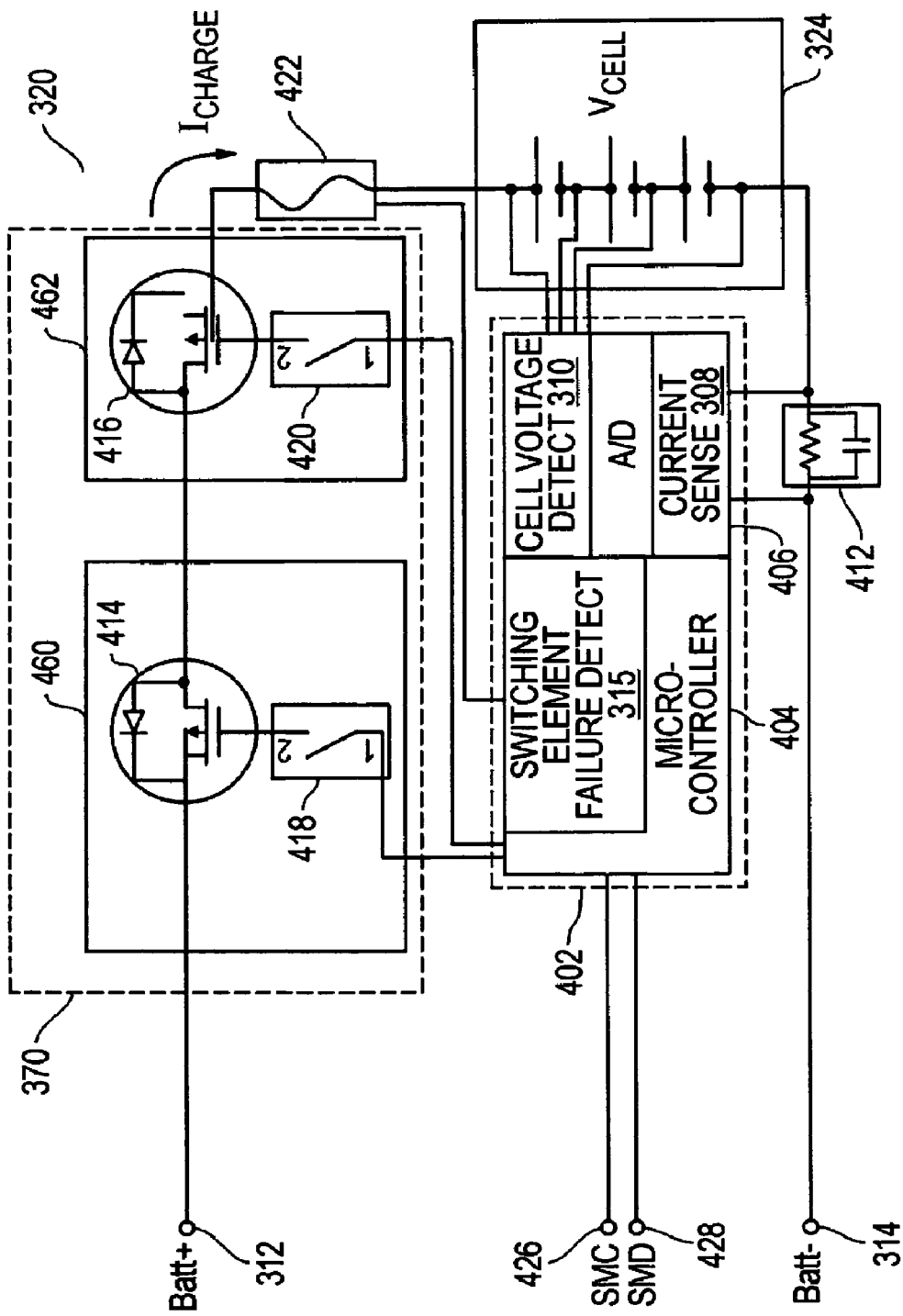
FIG. 4 is a block diagram of a battery system according to one embodiment of the disclosed systems and methods.

FIG. 4 illustrates battery system 320 of FIG. 3 as it may be implemented according to one exemplary embodiment of the disclosed systems and methods. As shown in this exemplary embodiment, functions of switching element failure detector 315, battery cell voltage detector 310 and current sensor 308 may be implemented by a battery management unit (BMU) 402 that is responsible for monitoring battery system operation and for controlling battery current control circuitry 370, although any other suitable configuration of circuitry, processor/s and/or control logic may be employed in other embodiments. As shown in FIG. 4, BMU 402 includes analog front end ("AFE") 406 and microcontroller 404. Battery current control circuitry 370 includes charge circuit 460 and discharge circuit 462 coupled in series between battery charge terminal 312 and battery cell/s 324. FET 414 is a charge FET switching element that forms a part of charge circuit 460 that is controlled by microcontroller 404 and/or AFE 406 of BMU 402 using charge circuit switch 418 to allow or disallow charging current to battery cell/s 324, and FET 416 is a discharge FET switching element that forms a part of discharge circuit 462 that is controlled by microcontroller 404 and/or AFE 406 of BMU 402 using discharge circuit switch 420 to allow or disallow discharge current from the battery cell/s 224. As shown, battery system 320 also includes battery system data bus terminals 426, 428 for providing battery state information, such as battery voltage, to corresponding data bus terminals of a battery charging apparatus.

During normal battery pack operations both charge and discharge FET switching elements 414 and 416 are placed in the closed state by respective switches 418 and 420, and cell voltage detector 310 of AFE 406 monitors voltage of battery cell/s 324. If cell voltage detector 310 of AFE 406 detects a battery over-voltage condition, BMU 402 opens the charge FET switching element 414 to prevent further charging of the battery cell/s until the over-voltage condition is no longer present. Similarly, if the cell voltage detector 310 of AFE 406 detects a battery under-voltage (or over-discharge) condition, BMU 402 opens the discharge FET switching element 416 to prevent further discharging of the battery cell/s until the under-voltage condition is no longer present. BMU 402 may also open the charge FET switching element 414 when the battery pack is in sleep mode. A current sense resistor 412 is present in the battery pack circuitry to allow current sensor 308 of AFE 406 to monitor charging current to the battery cell/s.

Switching element failure detector 315 of microcontroller 304 receives measured battery circuit current information from current sensor 308, and receives measured battery cell voltage information from cell voltage detector 310. If current sensor 308 indicates the presence of charging current when charge FET switching element 414 is supposed to be open (e.g., during sleep mode or battery over-voltage condition), and cell voltage detector 310 indicates that cell voltage is increasing at the same time, then BMU 402 permanently disables the battery pack by blowing inline fuse 422 present in the battery circuitry to open the battery pack circuitry and prevent further over-charging.

Switching element failure detector 315 may be configured to detect switching element failure using any suitable criteria or combination of criteria of monitored battery circuit current in combination with increasing battery cell voltage. One example of suitable criteria that may be optionally implemented by switching element failure detector 315 is a minimum charging current value and/or minimum duration of charging current that must be detected by current sensor 308 before switching element failure detector 315 is allowed to disable battery system 320. Other examples of optional criteria are a minimum battery cell voltage, minimum rate of battery cell voltage increase, and/or minimum duration of battery cell voltage increase that must be detected before switching element failure detector 315 is allowed to disable battery system 320.

Figure 5:
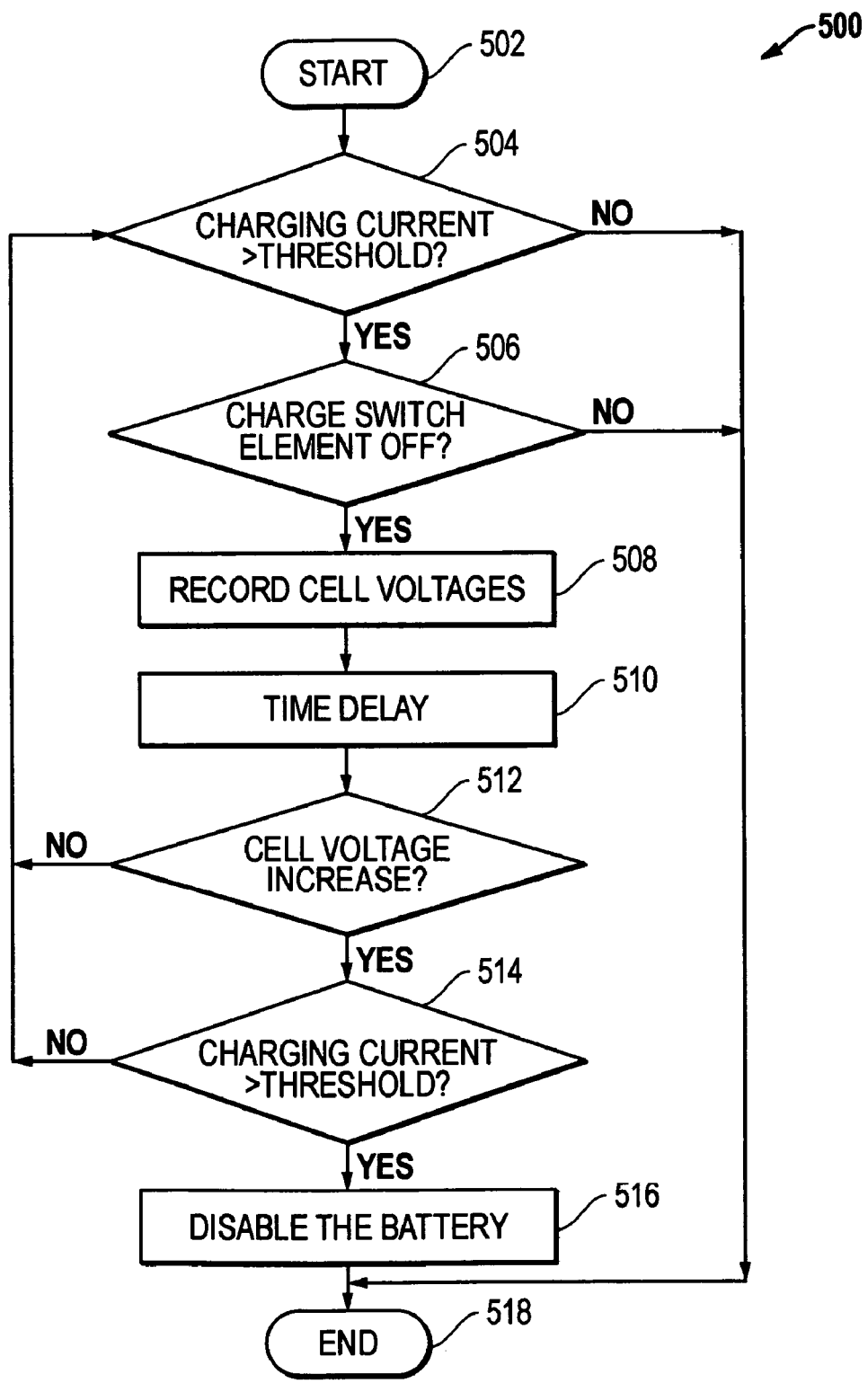
FIG. 5 is a flow diagram illustrating methodology according to another embodiment of the disclosed methods and systems.

FIG. 5 is a flow diagram illustrating methodology 500 that may be employed in one exemplary embodiment of the disclosed systems and methods to detect charge switching element failure in a battery system employing a charge circuit including a charge switching element, such as a battery system of a portable information handling system (e.g. notebook computer) or other electronic device. The methodology of FIG. 5 may be implemented, for example, using switching element failure detector 315 of the battery system embodiment illustrated and described in relation to FIG. 4, e.g., as a subroutine in firmware of microcontroller 404. However, it will be understood that the methodology of FIG. 5 may be implemented using any other suitable configuration of battery system and switching element failure detector, including battery systems employing FET or non-FET charge switching elements.

Switching element failure detection methodology 500 starts in step 502 during operation of the battery system. In step 504, a first value of battery charging current is monitored. If the first current value does not exceed a given threshold (e.g., 10 milliamperes), then no further action is taken. However, if the first current value exceeds the selected threshold, then the methodology proceeds to step 506. It will be understood that use of a threshold current value step (such as step 504) is optional, and that in other embodiments a switching element failure detection methodology may be implemented without a threshold current value step. Furthermore, when such a step is optionally employed, a given threshold value may be selected as needed or desired to fit the characteristics of a given battery system application, e.g., based on the minimum charging level of a battery charging apparatus employed with the given battery system. In one exemplary embodiment, threshold current value may be selected to be from about 10 milliamperes to about 15 milliamperes, although greater or lesser threshold values are possible.

In step 506, no further action is taken if the charge switching element is not supposed to be open, i.e., charge switching element is not in the "off" state. However, if the charge switching element is in the "off" state and is supposed to be open, then the method proceeds to step 508 where first measured voltages of one or more battery cells (individual cells, groups of cells, etc.) of the battery system are recorded. These recorded first measured voltages represent the measured voltage of the battery cell/s at a first time. A time delay value then follows in step 510 and may be selected based on characteristics of the battery charging apparatus, battery system and/or battery cell characteristics. In one exemplary embodiment, a time delay may be selected to be any time delay value suitable for allowing a measurable voltage increase to occur in the battery cell/s at the selected threshold current value, e.g., from about 10 seconds to about 2 minutes or any other suitable greater or lesser value.

Following the time delay of step 510, measured voltages taken at a second time are compared in step 512 to the recorded first measured voltages of step 508 to determine if cell voltage is increasing. These second measured voltages represent the measured voltage of the same battery cell/s of step 508, but taken at a second time that is later than the first time of step 508. If no voltage increase is found in step 512 this indicates that the measured charging current is a false charging current, the battery system is therefore allowed to continue to operate as normal, and the method of steps 504 to 512 is repeated again if the measured charging current of step 504 is still above the threshold current value.

However, if a voltage increase is found in step 512, the method proceeds to step 514 where a second and later measured value of battery charging current is evaluated to determine if it exceeds a second threshold current value, that may be the same or different than the first threshold current value of step 504. Step 512 is an optional step that may be employed to ensure that the first measured current value of step 504 is an actual charging current that is created by failure of a charge switching element by checking to see if the measured charging current has remained above the threshold current value through the duration of the time delay of step 510. If the second measured current value of step 514 is now equal to or below the threshold current value (e.g., 10 milliamperes), then this is an indication that the first measured current of step 504 was the result of a false current. This is because noise and/or radio frequency interference typically causes false currents that are unstable and irregular. However, if the second measured current value of step 514 still exceeds the threshold current value, then this is an indication that the first measured current of step 504 was a true charging current and that the charge switching element has failed.

In the event that the second measured current value of step 514 is equal to or below the threshold current value, the battery system is allowed to continue to operate as normal, and the method of steps 504 to 514 is repeated again if the measured charging current of step 504 is still above the threshold current value. However, if the second measured current value of step 514 exceeds the threshold current value, then the battery system is disabled in step 516, e.g., temporarily disabled by opening an inline switch, permanently disabled by blowing an inline fuse, etc. As previously described, step 514 of method 500 is an optional step. In another embodiment, step 514 may be omitted and a battery system may be immediately disabled following identification of a voltage increase in step 512. Alternatively, more than one additional current monitoring and/or voltage monitoring steps may be employed as desired or needed, e.g., as additional verification steps.

It will be understood that the particular order and combination of steps of method 500 is exemplary only, and that any combination of fewer, additional, or alternative steps may be performed in other embodiments that is suitable for detecting charge switching element failure in a manner consistent with the systems and methods disclosed and described elsewhere herein. For example, it is possible that voltage measurement tasks of steps 508 to 512 may be performed prior to, or performed simultaneously with, current measurement task of step 504.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device; or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A method of detecting charge switching element failure in a battery system, comprising:
    monitoring for the presence of a battery charging current flowing to one or more battery cells of said battery system;
    monitoring voltage of said one or more battery cells of said battery system;
    using a combination of said monitored voltage and said monitored battery charging current to sense failure of said charge switching element and without disabling the battery system due to a false charging current indication; and
    taking one or more failure state actions only if both of the following conditions are detected to exist at the same time when said charge switching element of said battery system is supposed to be in a state that prevents flow of battery charging current to said one or more, battery cells of said battery system and not taking said one or more failure state actions if both of the following conditions are not detected to exist at the same time when said charge switching element of said battery system is supposed to be in a state that prevents flow of battery charging current to said one or more battery cells of said battery system:
        (i) battery charging current is flowing to said one or more battery cells, and
        (ii) voltage of said one or more battery cells is detected to be increasing;
    wherein said charge switching element forms a part of a charge circuit that is controllable to allow or disallow charging current to said one or more battery cells from said battery charging apparatus; and
    wherein said method further comprises controlling said charge switching element to allow or disallow charging current to said one or more battery cells.

2. The method of claim 1, wherein said failure state action comprises permanently disabling said battery system.

3. The method of claim 2, further comprising only taking said failure state action if a measured value of said battery charging current detected exceeds a selected threshold current value.

4. The method of claim 3, wherein said step of monitoring comprises monitoring for the presence of a battery charging current flowing at a first time to one or more battery cells of said battery system; and wherein said method further comprises:
    monitoring for the presence of a battery charging current flowing at a second time to one or more battery cells of said battery system; and
    only taking said failure state action if a first measured value of said battery charging current detected at said first time exceeds a first selected threshold current value and a second measured value of said battery charging current detected at said second time exceeds a second selected threshold current value;
    wherein said second time is a later time than said first time; and wherein said second selected threshold current value is the same or different value than said first selected threshold current value.

5. The method of claim 3, wherein said battery system is a replaceable battery pack of a portable information handling system.

6. The method of claim 2, wherein said battery system is a replaceable battery pack of a portable information handling system; wherein said battery system is coupled to a battery charging apparatus; and wherein said replaceable battery pack comprises:
    battery current control circuitry coupled between said battery charging apparatus and said one or more battery cells, said battery current control circuitry including said charge switching element, and said charge switching element comprising a charge FET switching element that forms a part of a charge circuit that is controllable to allow or disallow charging current to said one or more battery cells from said battery charging apparatus;
    a battery management unit (BMU) including a microcontroller and an analog front end (AFE) circuitry, said BMU being coupled to said battery current control circuitry and being configured to control said charge FET switching element to allow or disallow charging current to said one or more battery cells, and said AFE being coupled to said one or more battery cells and being configured to monitor said battery charging current flow and to monitor said voltage of said one or more battery cells; and
    an inline fuse coupled between said battery charging apparatus and said one or more battery cells, said BMU being coupled to permanently disable said battery system by changing the state of said fuse;
    wherein said method further comprises using said BMU to permanently disable said battery system by changing the state of said inline fuse if both of the following conditions are detected to exist by said AFE when said charge FET switching element of said battery system is supposed to be off to prevent flow of battery charging current to said one or more battery cells of said battery system:
        (i) battery charging current is flowing to said one or more battery cells, and
        (ii) voltage of said one or more battery cells is detected to be increasing.

7. The method of claim 3, wherein said method further comprises:
    measuring a value of battery charging current flowing to one or more battery cells of said battery system;
    then comparing said measured value of battery charging current to a selected threshold current value;
    then checking for the state of said charge switching element if said measured value of battery charging current exceeds said selected threshold current value;
    then recording a first voltage value of said one or more battery cells measured at a first time if said charge switching element of said battery system is supposed to be in a state that prevents flow of battery charging current to said one or more battery cells of said battery system;

then comparing said first voltage value measured at a first time with a second voltage value of said one or more battery cells measured at a second time to detect if said voltage of said one or more battery cells is increasing, said second time being later than said first time and being separated from said first time by a time delay;

then permanently disabling said battery system if said measured value of battery charging current exceeds said selected threshold current value.

8. The .method of claim 7, wherein said battery system is a replaceable battery pack of a portable information handling system.

9. A battery system configured to be coupled to a battery charging apparatus, said battery system comprising:
one or more battery cells;
battery current control circuitry configured to be coupled between said battery charging apparatus and said one or more battery cells, said battery current control circuitry comprising at least one charge switching element configured to control flow of said charging current to said battery cells from said battery charging apparatus;
a switching element failure detector configured to use a combination of monitored voltage of said one or more battery cells and monitored battery charging current flowing to said one or more battery cells to sense failure of one or more charge switching elements without disabling the battery system due to a false charging current indication and configured to take one or more failure state actions only if both of the following conditions are detected to exist at the same time when said charge switching element of said battery system is supposed to be in a state that prevents flow of battery charging current to said one or more battery cells of said battery system and configured not to take said one or more failure state actions if both of the following conditions are not detected to exist at the same time when said charge switching element of said battery system is supposed to be in a state that prevents flow of battery charging current to said one or more battery cells of said battery system:
(i) battery charging current is flowing to said one or more battery cells, and
(ii) voltage of said one or more battery cells is detected to be increasing;
wherein said charge switching element forms a part of a charge circuit that is controllable to allow or disallow charging current to said one or more battery cells from said battery charging apparatus.

10. The battery system of claim 9, wherein said failure state action comprises permanently disabling said battery system.

11. The battery system of claim 10, wherein said switching element failure detector is configured to only take said failure state action if a measured value of said battery charging current exceeds a selected threshold current value.

12. The battery system of claim 11, wherein said switching element failure detector is configured to only take said failure state action if a first measured value of said battery charging current exceeds a first selected threshold current value and a second measured value of said battery charging current detected at a second time exceeds a second selected threshold current value; wherein said second time is a later time than said first time; and wherein said second selected threshold current value is the same or different value than said first selected threshold current value.

13. The battery system of claim 11, wherein said battery system is a replaceable battery pack of a portable information handling system.

14. The battery system of claim 10, wherein said battery system is a replaceable battery pack of a portable information handling system; and wherein said replaceable battery pack further comprises:
a current sensor coupled to monitor for the presence of a battery charging current flowing to said one or more battery cells of said battery system, and coupled to provide a signal representative of said monitored current to said switching element failure detector;
a battery cell voltage detector coupled to monitor voltage of said one or more battery cells, and coupled to provide a signal representative of said monitored voltage to said switching element failure detector;
wherein said charge switching element comprises a charge FET switching element that forms a part of a charge circuit that is controllable to allow or disallow charging current to said one or more battery cells from said battery charging apparatus;
wherein said switching element failure detector comprises a microcontroller (uP) of a battery management unit (BMU), said BMU including an analog front end (AFE) circuitry and said microcontroller (uP), and said BMU being configured to control said charge FET switching element to allow or disallow charging current to said one or more battery cells;
wherein said AFE comprises said current sensor and said battery voltage detector.

15. The battery system of claim 10, further comprising an inline fuse coupled between said battery charging apparatus and said one or more battery cells, said switching element failure detector being coupled to permanently disable said battery system by changing the state of said fuse if both of the following conditions are detected to exist when said charge switching element of said battery system is supposed to be in a state that prevents flow of battery charging current to said one or more battery cells of said battery system:
(i) battery charging current is flowing to said one or more battery cells, and
(ii) voltage of said one or more battery cells is detected to be increasing.

16. A portable information handling system comprising the battery system of claim 9.

17. A replaceable battery pack for a portable information handling system configured to be coupled to a battery charging apparatus, said replaceable battery pack comprising:
one or more battery cells;
a charge circuit configured to be coupled between said battery charging apparatus and said one or more battery cells, said charge circuit comprising a charge FET switching element and being configured to receive a charging current from said battery charging apparatus, said charge FET switching element forming a part of a charge circuit that is controllable to allow or disallow charging current to said one or more battery cells from said battery charging apparatus;
an inline fuse configured to be coupled between said battery charging apparatus and said one or more battery cells;
a battery management unit (BMU) coupled to said charge circuit, said BMU comprising a microcontroller and being configured to control said charge FET switching element to allow or disallow charging current to said one or more battery cells;
wherein said BMU is configured to sense failure of said charge FET switching element without disabling the battery system due to a false charging current indication and configured to control operation of said inline fuse so as to permanently disable said battery system only if both of the following conditions are detected to exist at the same time when said charge FET switching element of said battery system is supposed to be off to prevent flow of battery charging current to said one or more battery cells of said battery system and configured not to take said one or more failure state actions if both of the following conditions are not detected to exist at the same time when said charge FET switching element of said battery system is supposed to be in a state that prevents flow of battery charging current to said one or more battery cells of said battery system:
(i) battery charging current is flowing to said one or more battery cells, and
(ii) voltage of said one or more battery cells is detected to be increasing.

18. The replaceable battery pack of claim 17, wherein said BMU further comprises an analog front end (AFE) coupled to monitor said battery charging current flowing to said one or more battery cells, and coupled to monitor said voltage of said one or more battery cells.

19. The replaceable battery pack of claim 18, wherein said battery system is a battery pack of a portable information handling system.

20. A portable information handling system comprising the replaceable battery pack of claim 17.

21. The method of claim 3, wherein said method further comprises:
measuring a first value of battery charging current flowing to one or more battery cells of said battery system;
then comparing said measured first value of battery charging current to a first selected threshold current value;
then checking for the state of said charge switching element if said first measured value of battery charging current exceeds said first selected threshold current value;
then recording a first voltage value of said one or more battery cells measured at a first time if said charge switching element of said battery system is supposed to be in a state that prevents flow of battery charging current to said one or more battery cells of said battery system;
then comparing said first voltage value measured at a first time with a second voltage value of said one or more battery cells measured at a second time to detect if said voltage of said one or more battery cells is increasing, said second time being later than said first time and being separated from said first time by a time delay; and
then proceeding as follows if said voltage of said one or more battery cells is detected to be increasing in the previous step:
measuring a second value of battery charging current flowing to one or more battery cells of said battery system at a time later than a time of said measurement of said first value of battery charging current flowing to said one or more battery cells of said battery system,
then comparing said measured second value of battery charging current to a second selected threshold current value, and
then permanently disabling said battery system if said second measured value of battery charging current exceeds said second selected threshold current value.

22. The battery system of claim 11, wherein said battery system is configured to:
measure a value of battery charging current flowing to one or more battery cells of said battery system;
then compare said measured value of battery charging current to a selected threshold current value;
then check for the state of said charge switching element if said measured value of battery charging current exceeds said selected threshold current value;
then record a first voltage value of said one or more battery cells measured at a first time if said charge switching element of said battery system is supposed to be in a state that prevents flow of battery charging current to said one or more battery cells of said battery system;
then compare said first voltage value measured at a first time with a second voltage value of said one or more battery cells measured at a second time to detect if said voltage of said one or more battery cells is increasing, said second time being later than said first time and being separated from said first time by a time delay; and
wherein said switching element failure detector is configured to then permanently disable said battery system if said measured value of battery charging current exceeds said selected threshold current value and said comparison of said first and second voltage values indicates said one or more battery cells is increasing.

23. The replaceable battery pack of claim 11, wherein said battery system is configured to:
measure a first value of battery charging current flowing to one or more battery cells of said battery system;
then compare said measured first value of battery charging current to a first selected threshold current value;
then check for the state of said charge switching element if said measured first value of battery charging current exceeds said first selected threshold current value;
then record a first voltage value of said one or more battery cells measured at a first time if said charge switching element of said battery system is supposed to be in a state that prevents flow of battery charging current to said one or more battery cells of said battery system;
then compare said first voltage value measured at a first time with a second voltage value of said one or more battery cells measured at a second time to detect if said voltage of said one or more battery cells is increasing, said second time being later than said first time and being separated from said first time by a time delay;
then proceed as follows if said voltage of said one or more battery cells is detected to be increasing in the previous step:
measure a second value of battery charging current flowing to one or more battery cells of said battery system at a time later than a time of said measurement of said first value of battery charging current flowing to said one or more battery cells of said battery system,
then compare said measured second value of battery, charging current to a second selected threshold current value; and
wherein said switching element failure detector is configured to then permanently disable said battery system if said second measured value of battery charging current exceeds said second selected threshold current value.

* * * * *